United States Patent [19]

Portmann

[11] Patent Number: 5,103,070
[45] Date of Patent: Apr. 7, 1992

[54] RAIL FOR GUIDING SHEET-METAL EDGES WHICH ARE TO BE WELDED TOGETHER

[75] Inventor: Niklaus Portmann, Bellikon, Switzerland

[73] Assignee: Elpatronic, AG, Zug, Switzerland

[21] Appl. No.: 726,294

[22] Filed: Jul. 5, 1991

[30] Foreign Application Priority Data

Aug. 7, 1990 [CH] Switzerland .................. 02584/90

[51] Int. Cl.⁵ .................... B23K 11/32; B23K 37/04
[52] U.S. Cl. .................................. 219/64; 228/17.5
[58] Field of Search .............. 219/61.3, 64, 61.13, 219/82; 228/17.5

[56] References Cited

U.S. PATENT DOCUMENTS

| 4,571,476 | 2/1986 | Pazzaglia | 219/64 |
| 4,649,251 | 3/1987 | Kai | 219/64 |
| 4,912,292 | 3/1990 | Hartz | 219/64 |

FOREIGN PATENT DOCUMENTS 3432505  4/1985  Fed. Rep. of Germany .
9002016  3/1990  PCT Int'l Appl. .

Primary Examiner—Geoffrey S. Evans
Attorney, Agent, or Firm—McCormick, Paulding & Huber

[57] ABSTRACT

A Z rail for welding the longitudinal edges of can bodies has two supporting bodies, each with a longitudinal groove comprising two lateral surfaces which are at least roughly parallel to each other, and a base surface which is at least roughly perpendicular to the lateral surfaces. Each groove has an undercut profile with an enlargement, which separates one of the lateral surfaces from the base surface. An insert of hard material is interchangeably fastened in the enlargement. The insert extends at least to the plane of the opposite lateral surface and has an outer surface directed away from the base surface. These outer surfaces support the respective edges of edge margins of the sheet metal that is to form the can body. The lateral surfaces of the groove in each supporting body are designed for the direct guidance of lateral faces of the sheet-metal edge margin.

8 Claims, 2 Drawing Sheets

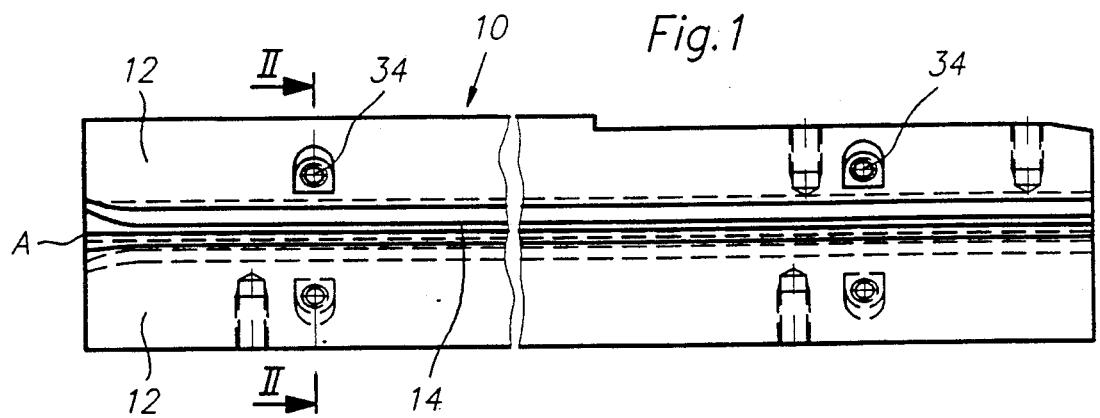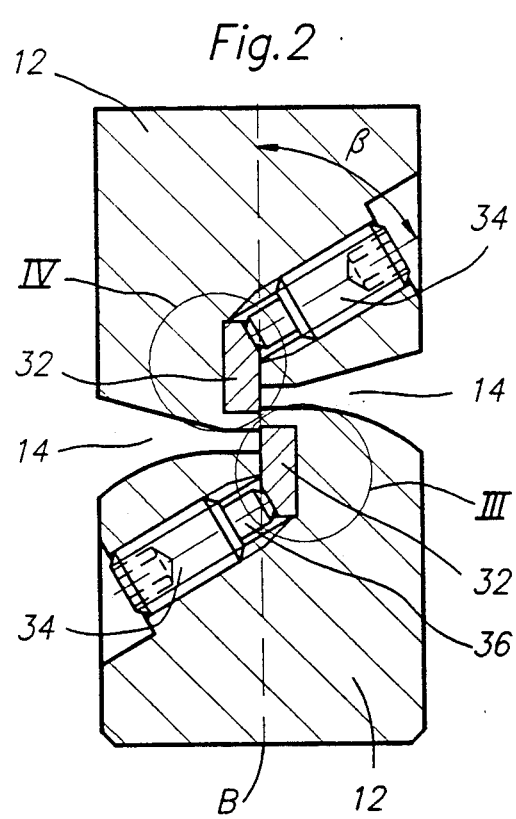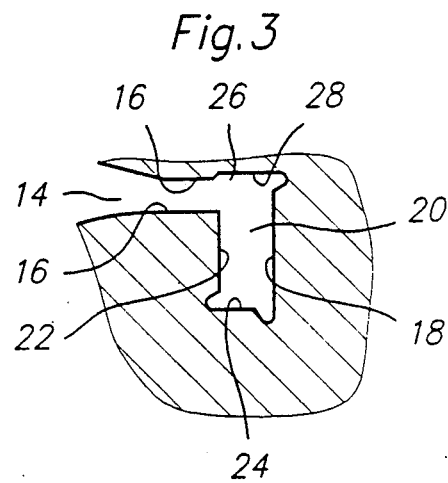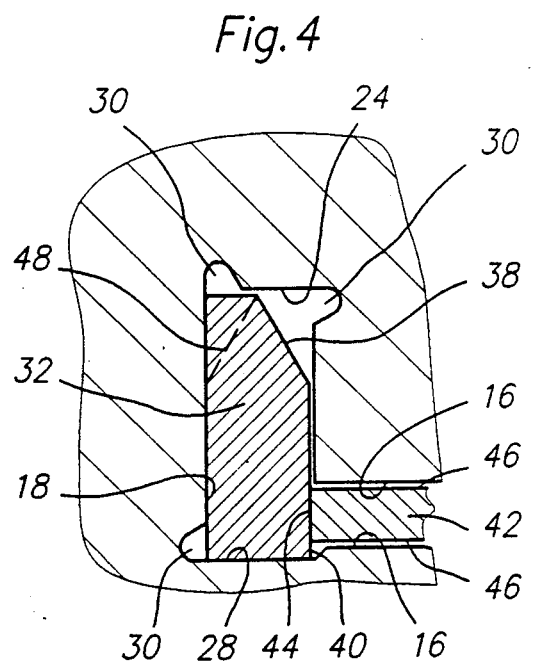

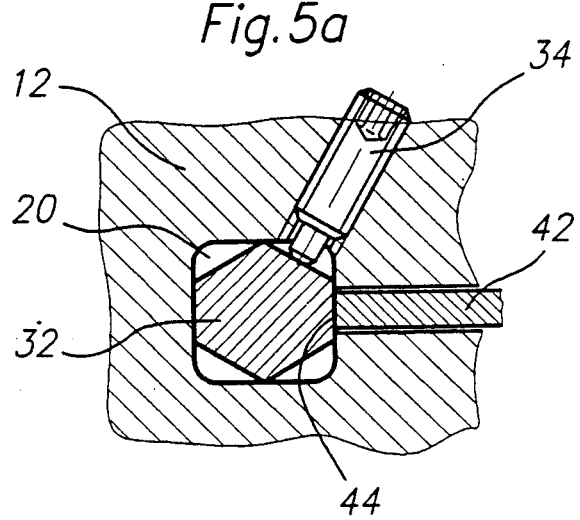
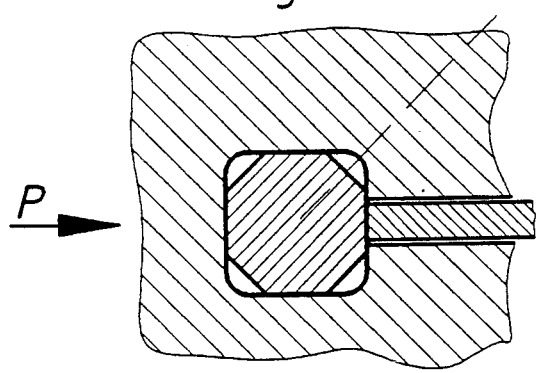
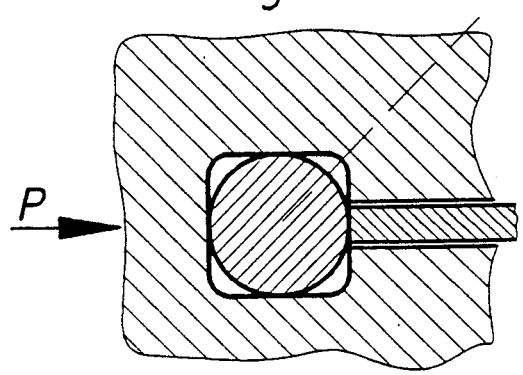

RAIL FOR GUIDING SHEET-METAL EDGES WHICH ARE TO BE WELDED TOGETHER

BACKGROUND OF THE INVENTION

The invention relates to a rail for guiding at least one of two sheet-metal edge margins, more especially longitudinal edge margins of can bodies, which are to be welded together, having a supporting body with a longitudinal groove, which comprises two lateral surfaces which are at least approximately parallel to each other and a base surface which is at least approximately perpendicular to the lateral surfaces, and an insert of hard material which is fastened in the longitudinal groove and butts against its base surface.

Such a rail in the form of a so-called Z rail is known from Document WO 90/02016. This Z rail has an upper and a lower supporting body, in which an upper or lower longitudinal groove respectively is incorporated from one side. In each of the longitudinal grooves is fastened an insert in which a guide groove for a sheet metal edge is formed. The inserts are composed of tungsten carbide or material such as silicon nitride, aluminium oxide or another non-abrasive, electrically non-conducting material and are fastened in the supporting body by sticking; immediately thereafter, their guide grooves are formed by grinding. When the inserts are worn out, they have to be replaced together with the supporting body, as a renewal of the inserts on the spot is not possible.

From DE 3432505 Al is known as a Z rail which has two supporting bodies, arranged one over the other, to which slide bodies are fastened. The slide bodies are profiled stepwise and arranged to engage in each other in such a way that together they form two longitudinal grooves situated one above the other and overlapping one another for guiding a sheet-metal edge margin in each case. Overlap of the two edge margins and the spacing of their heights can be varied within certain limits by adjusting the slide bodies. The manufacture of these stepwise profiled slide bodies is costly. If the bodies are composed of hard material, for example, tungsten carbide or a ceramic material, they are then sensitive to shock, and there is a danger that they may break with careless clamping on the associated supporting bodies.

SUMMARY OF THE INVENTION

The task which therefore underlies the invention is to develop a rail for guiding at least one of two sheet-metal edge margins to be welded together, in such a way that wear can be made good rapidly at low cost.

The problem is solved according to the invention, starting from a rail of the type hereinbefore described, in that the longitudinal groove has an undercut profile with an enlargement which separates one of the lateral surfaces of the groove from the base surface of the groove, the insert is fastened interchangeably in the enlargement, extends from there at least as far as the plane of the opposite lateral surface of the groove, and has an outer surface directed away from the base surface of the groove for supporting an end edge of the sheet-metal edge margin, and the lateral surfaces of the groove of the supporting body are formed for direct guidance of lateral faces of the sheet-metal edge margin.

In the case of the rail according to the invention, the or each insert only has to support and guide the edge of the appropriate sheet-metal margin. For this reason, the insert can be free from any groove or stepping. A simple insert of this type is relatively easy to manufacture and not very susceptible to breakage. The lateral surfaces of the groove, which in the rail according to the invention are formed from the supporting body itself, in contrast to the known rails described, are only lightly loaded by the lateral faces of the sheet metal which they have to guide. These lateral faces are also conventionally rolled surfaces which, by comparison with the normally stamped or cut face of the sheet-metal end edge, are smooth and hence create little friction. The supporting body can therefore be composed of normal tool steel, for example, without considerable wear having to be anticipated on the lateral surfaces of the groove. To reduce wear the supporting body can be hardened and-/or, e.g. for reasons of insulation, coated with $AlO_2$.

Advantageous developments of the invention are described hereinafter.

BRIEF DESCRIPTION OF THE DRAWINGS

An exemplified embodiment of the invention is explained with further details hereafter, by reference to diagrammatic drawings.

FIG. 1 shows a Z rail in side view,

FIG. 2 shows the section II—II in FIG. 1 considerably enlarged,

FIG. 3 shows the detail III in FIG. 2,

FIG. 4 shows the detail IV in FIG. 2, but even more enlarged, and,

FIGS. 5a, 5b and 5c are similar detail sections showing alternative forms of insert and their receiving enlargement in the body of the Z rail.

DESCRIPTION OF THE PREFERRED EMBODIMENTS

The Z rail illustrated has two supporting bodies 12, which are symmetrically shaped in relation to each other with respect to a longitudinal central axis A of the Z rail, and are manufactured in one piece from tool steel.

Each of the supporting bodies 12 has a longitudinal groove 14 with two parallel lateral surfaces 16 which are horizontal in the installed position, and a vertical base surface 18. Within each supporting body 12 the longitudinal groove 14 has an enlargement 20, which is defined by the base surface 18 of the groove, a counter-surface 22 parallel thereto, and a flank 24 which is normal to these two surfaces and is therefore horizontal in the installed position. Facing the enlargement 20, there is formed in each longitudinal groove 14 an indent 26, which is defined by a counter-flank 28 parallel to the flank 24. The enlargement 20 and the indent 26 of each longitudinal groove 14 therefore form a cavity of rectangular cross-section between the sides of which, instead of corners, there are rounded depressions 30.

In each of the enlargements 20 is fastened an insert 32 of hard abrasion-resistant material, for example, of hard metal or ceramic material. The insert has a rectangular cross-section and extends into the indent 26. Pins 34 are screwed into each of the supporting bodies 12 at longitudinally spaced positions, each of the pins having a tip 36 projecting into the enlargement 20. The pins 34 are inclined to the vertical longitudinal central plane B of the Z rail 10 at an angle β of 45° to 75°, preferably approximately 60°, and press with their tips 36 against a correspondingly inclined oblique abutment face 38 on the associated insert 32. Each of the inserts 32 is therefore pressed by the pins 34 against the associated groove base surface 18 and counter-flank 28 and is thereby rigidly fastened in the supporting body 12.

Each of the inserts 32 has an outer surface 40, which is directed away from the associated base surface 18 and is parallel to it, and on which a sheet-metal edge margin 42 of a can body is supported and guided by its stamped or cut end face 44. The lateral surfaces 16 formed on the supporting body 12 cooperate each with a respective one of the lateral faces 46 of the sheet-metal edge margin 42 which are directed away from each other, as guide surfaces.

On each of the inserts 32 further oblique abutment surfaces 48 can be formed, as indicated with a dotted line in FIG. 4 in such a way that the insert 32, when its outer surface 40 is worn, can be removed and reassembled turned round, in order to make it possible for it to be re-used with that surface turned outwardly which hitherto was butted against the base surface 18 of the groove.

FIGS. 5a, 5b and 5c illustrate some alternative inserts 32 in a modified supporting body. In the body 12, the groove 14 opens into an enlargement 20 that has a regular polygonal cross-section, in all three examples a square with rounded corners. The enlargement 20 is disposed symmetrically relative to the central plane of the groove 14. In the enlargement there fits an insert 32 which has a regular cross-section the major dimensions of which match the major dimensions of the enlargement cross-section. In FIG. 5a the insert cross-section is a slightly flattened hexagon, in FIG. 5b it is an octagon, and in FIG. 5c it is a circle.

In the example of FIG. 5a the insert can be reversed to bring the face furthest from the groove to adjoin the groove when the sheet-metal edge support is to be renewed. If the wear on the support face is eccentric, it is also possible to extend the life of the insert by reversing it in the lateral sense, i.e. by rotation through 180° about an axis parallel to the groove.

In the example of FIG. 5b the two senses of reversal just referred to give four alternative bearing faces. With the example of FIG. 5c the insert is continuously adjustable to bring a fresh surface into use by rotation about its own central axis.

The drawing also illustrates how the three different cross-sections each provide an oblique abutment face for the clamping pin 32, in the same manner as is described with reference to the example of FIGS. 1–4.

I claim:

1. Rail for guiding at least one of two sheet-metal edge margins, more especially of longitudinal edges of can bodies, which are to be welded together, having a supporting body with a longitudinal groove which comprises two lateral surfaces at least approximately parallel to each other and a base surface which is at least approximately perpendicular to the lateral surfaces, and an insert of hard material, which is fastened in the longitudinal groove and butts against its base surface, characterized in that the longitudinal groove has an undercut profile with an enlargement which separates one of the lateral surfaces from the base surface, the insert is interchangeably fastened in the enlargement, extends at least as far as the plane of the opposite lateral surface and has an outer surface which is directed away from the base surface for supporting an end edge of the sheet-metal edge margin; and the lateral surfaces of the groove of the supporting body are formed for direct guidance of lateral faces of the sheet-metal edge margin.

2. Rail as claimed in claim 1, characterized in that the insert has a uniform polygonal cross-section.

3. Rail as claimed in claim 1, characterized in that the longitudinal groove is undercut on both sides, so that an indent faces the enlargement, and the insert extends from the enlargement through the longitudinal groove into the indent.

4. Rail as claimed in claim 3, characterized in that the enlargement and the indent together define a profile which matches the insert and has rounded depressions at corner regions.

5. Rail as claimed in claim 1, characterized in that at least one bore receiving a pin for clamping the insert opens into the enlargement.

6. Rail as claimed in claim 5, characterized in that the pin is a threaded pin.

7. Rail as claimed in claim 5, characterized in that the pin extends at such an angle to the base surface that a force exerted by the pin on the insert has a component which moves the insert towards the opposite lateral surface.

8. Rail as claimed in claim 5, characterized in that the insert has an oblique abutment surface for a tip of the pin.

* * * * *